(12) United States Patent
Liu et al.

(10) Patent No.: US 7,881,191 B2
(45) Date of Patent: Feb. 1, 2011

(54) METHOD AND APPARATUS FOR DOWNLINK MULTI-CHANNEL PACKET COMBINED SCHEDULING IN MOBILE COMMUNICATION SYSTEM

(75) Inventors: Sheng Liu, Guangdong (CN); Baijun Zhao, Guangdong (CN)

(73) Assignee: Utstarcom (China) Co. Ltd., Beijing (CN)

( * ) Notice: Subject to any disclaimer, the term of this patent is extended or adjusted under 35 U.S.C. 154(b) by 1044 days.

(21) Appl. No.: 10/579,170

(22) PCT Filed: Nov. 12, 2003

(86) PCT No.: PCT/CN03/00952

§ 371 (c)(1),
(2), (4) Date: Jan. 24, 2007

(87) PCT Pub. No.: WO2005/048613

PCT Pub. Date: May 26, 2005

(65) Prior Publication Data

US 2009/0016275 A1    Jan. 15, 2009

(51) Int. Cl.
*G01R 31/08* (2006.01)
*G06F 11/00* (2006.01)

(52) U.S. Cl. .................. 370/230; 455/436; 455/449; 370/236; 370/233

(58) Field of Classification Search .......... 370/236, 370/233; 455/436
See application file for complete search history.

(56) References Cited

U.S. PATENT DOCUMENTS 5,757,772 A * 5/1998 Thornberg et al. .......... 370/236
6,377,548 B1 * 4/2002 Chuah ........................ 370/233
2002/0021679 A1 * 2/2002 Paneth et al. ............... 370/330
2002/0082013 A1   6/2002 Lee et al.
2005/0099961 A1 * 5/2005 Holma ....................... 370/252
2005/0185651 A1 * 8/2005 Rinne ...................... 370/395.1

FOREIGN PATENT DOCUMENTS

EP    1257096    11/2002

OTHER PUBLICATIONS

Chiussi, F.M ; Francini, A "Minimum-Delay Self-Clocked Fair Queueing Algorithn for Packet-Switched Networks" IEEE vol. 3 Pub 1998.*

* cited by examiner

*Primary Examiner*—Jefferey F Harold
*Assistant Examiner*—Jason Harley
(74) *Attorney, Agent, or Firm*—Ladas & Parry LLP

(57) ABSTRACT

The present invention sets forth a method for performing packet combined scheduling of dedicated transport channels for packet services in UMTS downlinks, comprising the following steps: a) prior to each DCH scheduling period, performing pre-selection processing of a transport format combination of each DPCH according to the predetermined restriction conditions for the DCH combined packet scheduling, so as to determine a usable transport format combination set for each DPCH; b) restricting a total downlink transmit power of DCHs for NRT packet services to a schedulable power not exceeding a schedulable power value in the estimation of a total downlink power during said scheduling period; c) based on the fairness of DCH transportation and the QoS requirements of the DCH-borne services, determining weighted values which the respective DCHs correspond to in the optimization of the DCH combined packet scheduling; and d) based on the results of steps a), b), and c), calculating the maximum number of bits which each DCH is schedulable to output, using a 0-1 programming algorithm. The present invention guarantees the fairness, priority and QoS (Quality of Service) of different DCHs and can achieve maximum total data throughput.

19 Claims, 6 Drawing Sheets

METHOD AND APPARATUS FOR DOWNLINK MULTI-CHANNEL PACKET COMBINED SCHEDULING IN MOBILE COMMUNICATION SYSTEM

FIELD OF TECHNOLOGY

The present invention generally relates to the techniques concerning downlink packet scheduling in a mobile communication system. In particular, the present invention relates to a method and apparatus for the optimum packet combined scheduling of dedicated transport channels for packet services in UMTS (Universal Mobile Telecommunications System) downlinks.

BACKGROUND ART

UMTS (Universal Mobile Telecommunications System) is the $3^{rd}$ generation mobile communication system of the radio technology using WCDMA. In the system architecture of the UMTS terrestrial radio access network (UTRAN) shown in FIG. 1, a radio network controller (RNC) is connected to a core network via an Iu interface, the RNCs are interconnected via an Iur interface, and one RNC is connected to one or more Node Bs via an Iub interface. A Node B contains one or more cells, the cell being a basic unit to which a user equipment (UE) has wireless access (not shown), wherein a radio interface between the UE and the UTRAN is a Uu interface (not shown).

In the protocol documents of the standardization organization 3GPP (the 3rd Generation Partnership Project) of the UMTS, there mainly are TS25.2XX, TS25.3XX and other serial specifications relevant to the UMTS radio interface protocol. In the UMTS radio interface protocol architecture as shown in FIG. 2, the bottom layer is a physical (PHY) layer, and in a control plane, above the physical layer are a media access control (MAC) layer, a radio link control (RLC) layer and a radio resource control (RRC) layer, respectively; in a user plane, the radio interface protocol consists of the physical layer, the MAC layer, the RLC layer and a packet data convergence protocol (PDCP) layer, wherein the PDCP layer is only for a packet-switch (PS) domain. Physical channels are provided by the physical layer, logical channels are provided between the MAC layer and the RLC layer, and transport channels are provided between the MAC layer and the physical layer.

In the UMTS radio access network (UTRAN) of R99, the logical channels of the control type include BCCH (Broadcasting Control Channel), PCCH (Paging Control Channel), DCCH (Dedicated Control Channel), CCCH (Common Control Channel), etc.; the logic channels of the traffic type include DTCH (Dedicated Traffic Channel), CTCH (Common Traffic Channel), etc. Uplink transport channels comprise RACH (Random Access Channel), CPCH (Common Packet Channel), DCH (Dedicated Channel), etc., while downlink transport channels comprise BCH (Broadcast Channel), PCH (Paging Channel), FACH (Forward Access Channel), DSCH (Downlink Shared Channel), and DCH, etc. One of the primary functions of the MAC layer is to map logical channel as transport channel. FIG. 3 shows the mapping relations between downlink logic channels and transport channels.

According to the 3GPP specification including 3GPP TS 25.212, 3GPP TS 25.302 and other documents, a TFI (Transport Format Indication) of each transport channel corresponds to one transport format in a Transport Format Set (TFS) of the transport channel. In each TTI (Transport Time Interval), as illustrated in FIG. 4, an upper layer transports TBs (Transport Blocks) of the respective transport channels to a PHY layer based on a certain Transport Format Combination (TFC); the PHY layer then combines the TFI information from the different transport channels into a TFCI (Transport Format Combination Indication), encodes it and transports it on a TFCI field of the PHY channel; after that, a receiving terminal decodes the TFCI field so as to precisely receive the TBs from the respective transport channels.

In UMTS, the main factor which influences downlink capacity, coverage and other performances is a limited downlink power. The total maximum transmit power of downlinks in a cell is determined by a rated output power of a base station power amplifier, and this power is typically divided into fixed static power, non-schedulable power, and schedulable power, etc., as shown in FIG. 5. The fixed static power is used for downlink common control channels in a cell, such as common piloting, synchronizing, is paging and so forth, and this fixed static power is determined by cell configuration and other parameters; the non-schedulable power is a power occupied by real-time services including conversational type and streaming type services, wherein the real-time service allows the selection of a certain rate, but the rate itself is still required to be constant, so this power is non-schedulable; the schedulable power is mainly used for NRT (Non Real-Time) packet services such as interactive type and background type services, which allows for a dynamic change in the rate, so the power occupied by these services is schedulable.

When utilizing DCHs to transport interactive or background NRT packet data, a total power of DCHs bearing packet services of a plurality of different users forms the above non-schedulable power. However, in the downlink direction of UTRAN, each UE has a DCH functional entity MAC-d corresponding thereto, but the MAC-d entities of different UEs are independent of each other. Therefore, each cell must utilize a chief scheduling unit for conducting combined packet scheduling of all the DCHs in the cell employed for transporting NRT packet data. Nevertheless, the existing downlink packet scheduling technology in the UMTS is mainly aimed at common or shared channels such as FACH/DSCH, etc., and the scheduling of the common or shared type channels can be basically summed up as a problem that a plurality of input data streams shares an output channel with limited bandwidth resources. In practice, as for the familiar scheduling problems in this type of telecommunications, there are a large number of mature and effective algorithms at present, typically such as Round-Robin, WFQ (Weighted Fair Queuing), $WF^2Q$ (Worst-case Fair Weighted Fair Queuing) and so forth. Please refer to "H. Zhang, Service disciplines for guaranteed performance service in packet-switching networks, Proceedings of the IEEE, vol. 83, pp. 1374-1396, Oct. 1995", "V. Bharghavan, S. Lu and T. Nandagopal, Fair queuing in wireless networks: Issues and Approaches, IEEE Personal Communication, Vol. 6, No. 1, pp. 44-53, February 1999", and other documents.

SUMMARY OF THE INVENTION

The prior art lacks an effective and optimized method for combined packet scheduling of DCHs used for packet services in the UMTS downlinks. Thus, one object of the present invention is to provide a method for downlink DCH combined packet scheduling and an apparatus for realizing the same, and this method has a small calculation amount, guarantees the fairness, priority and QoS (Quality of Service) of different DCHs, and is optimized in the sense of the maximum total data throughput.

A further object of the present invention is to solve the technical problems of complex calculation, time-consuming and imperfectness encountered during a programming of the downlink DCH combined packet scheduling, and convert these problems into an optimization problem with restrictions, thereby optimizing the downlink DCH combined packet scheduling method.

The above objects of the present application are fulfilled by a method for packet combined scheduling of dedicated transport channels for packet services in UMTS downlinks, wherein dedicated traffic channels (DTCHs) in logical channels are mapped as dedicated channels (DCHs) in transport channels, and N DCHs, in their respective input queues, queue up for being transported to the corresponding M DPCHs, where M≦N, the method being characterized in that the method for packet combined scheduling of the DCHs comprises the following steps: a) prior to each DCH scheduling period, performing pre-selection processing of a transport format combination of each DPCH according to the predetermined restriction conditions for the DCH combined packet scheduling, so as to determine a usable transport format combination set $TFCS_m^{(2)}$ for each DPCH; b) restricting a total downlink transmit power $$\sum_{n=1}^{N} P_{k,n}$$

of DCHs for NRT packet services to a schedulable power not exceeding a schedulable power value in the estimation of a total downlink power during said scheduling period, i.e., the maximum allowable power value $P_k^{Scheduled}$, where $P_{k,n}$ denotes an average transmit power required by the N-th DCH in the k-th scheduling period, and $P_k^{Scheduled}$ denotes the maximum allowable power allocated to the DCHs which bear NRT packet services in the estimation of downlink power in the k-th scheduling period; c) based on the fairness of DCH transportation and the QoS requirements of the DCH-borne services, determining weighted values which the respective DCHs correspond to in the optimization of the DCH combined packet scheduling; and d) based on the results of steps a), b), and c), calculating the maximum number of bit(s) which each DCH is schedulable to output, using a 0-1 programming algorithm.

The above objects of the present application are also fulfilled by an apparatus for performing packet combined scheduling of dedicated transport channels for packet services in UMTS downlinks, wherein dedicated traffic channels (DTCHs) in the logical channels are mapped as dedicated channels (DCHs) in the transport channels, and N DCHs, in their respective input queues, queue up for being transported to the corresponding M DPCHs, where M≦N; the apparatus being characterized in that the apparatus for performing the packet combined scheduling of the DCHs comprises: a pre-selection processing unit for, prior to each DCH scheduling period, performing pre-selection processing of a transport format combination of each DPCH according to the predetermined restriction conditions for the DCH combined packet scheduling, so as to determine a usable transport format combination set $TFCS_m^{(2)}$ for each DPCH; a power restriction proportional coefficient calculating unit for calculating a predicted/estimated value $ĉ_{k,n}$ of a proportional coefficient of an average transmit power $P_{k,n}$ of the n-th DCH within the k-th scheduling period and the number of bit(s) $R_{k,n}$ which the DCH is schedulable to output within the scheduling period; a target function weighted value calculating unit for, based on fairness of DCH transportation and QoS requirements of the DCH-borne services, calculating corresponding weighted values of respective DCHs in optimization of the combined packet scheduling; and a 0-1 programming-based optimization calculating unit for, based on output results of the pre-selection processing unit, the power calculating unit and the target function weighted value calculating unit, calculating the maximum number of bit(s) which each corresponding DCH is schedulable to output, by using a linear programming algorithm.

The method and apparatus for combined packet scheduling of the downlink DCHs in the UMTS according to the present invention realize the following goals: (a) maximizing the overall flow of data output in each scheduling so as to effectively exploit radio resources to the fullest extent, and meanwhile, supplying users with the maximum data transport rate under the condition of limited radio resources; (b) guaranteeing the fairness of the respective DCH transportation and ensuring each user to obtain the maximum data transport rate as much as possible; and (c) reflecting and guaranteeing the priority requirements of the DCHs.

BRIEF DESCRIPTION OF THE ACCOMPANYING DRAWINGS

The modes for carrying out the invention are described below with reference to examples and the accompanying drawings.

Figure 1:
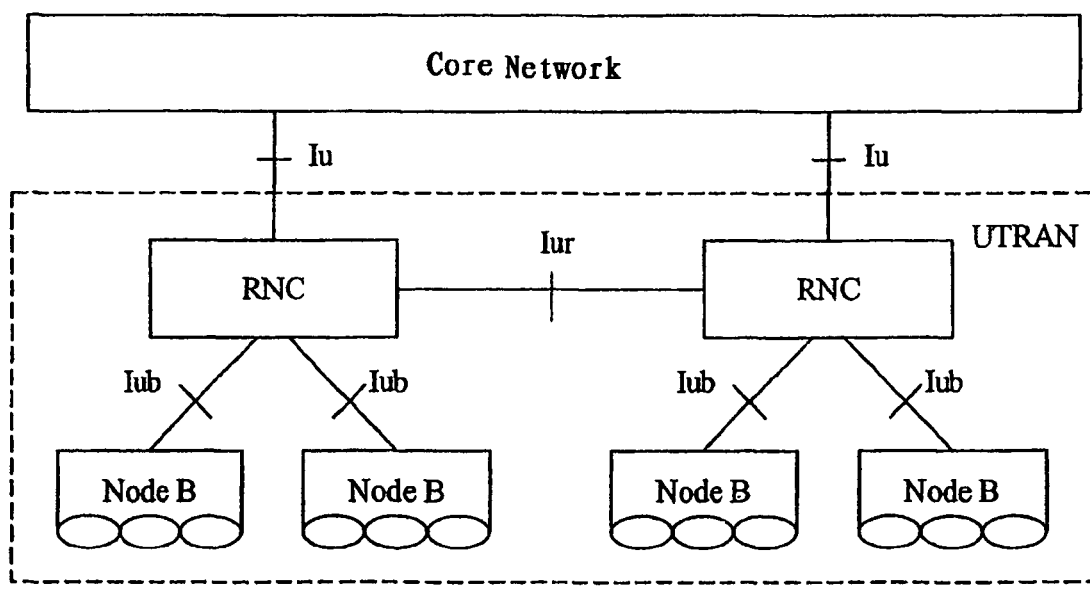
FIG. 1 is a schematic view showing the network architecture of the UTRAN to which the present invention is applied.
Figure 2:
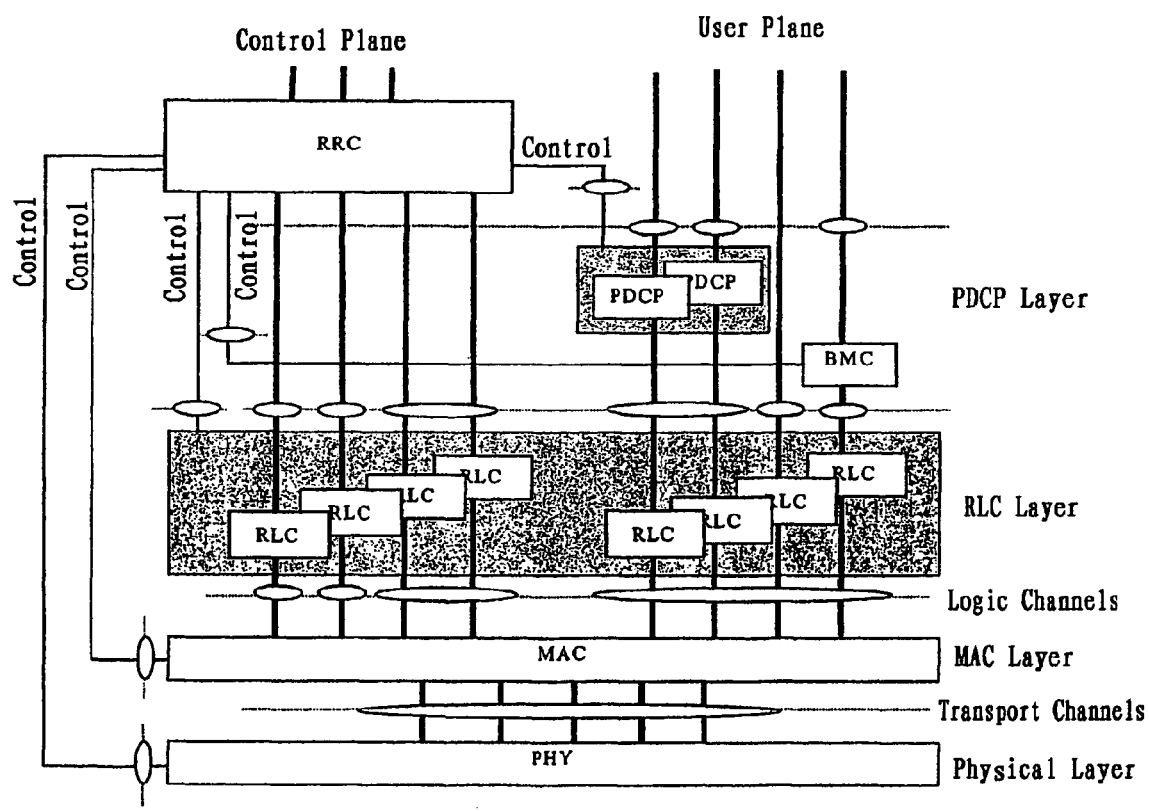
FIG. 2 is a schematic view showing a radio interface protocol architecture of the UTRAN to which the present invention is applied.
Figure 3:
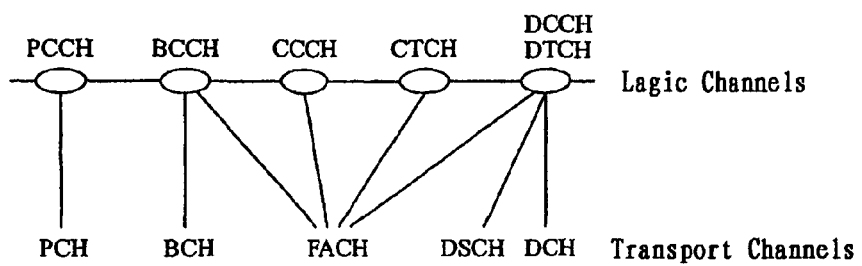
FIG. 3 shows the mapping relations between downlink logic channels and transport channels in the UTRAN to which the present invention is applied.
Figure 4:
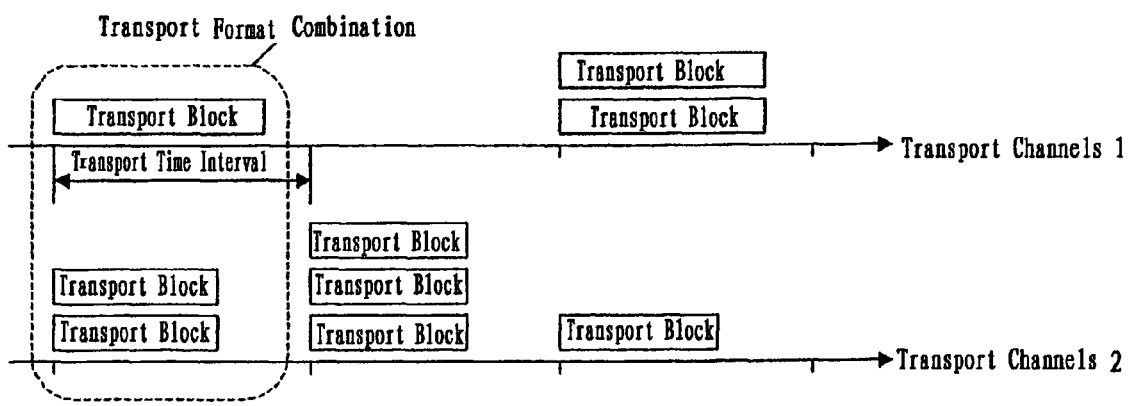
FIG. 4 is a schematic view showing transport channels, transport blocks and a transport format combination in the UTRAN to which the present invention is applied.
Figure 5:
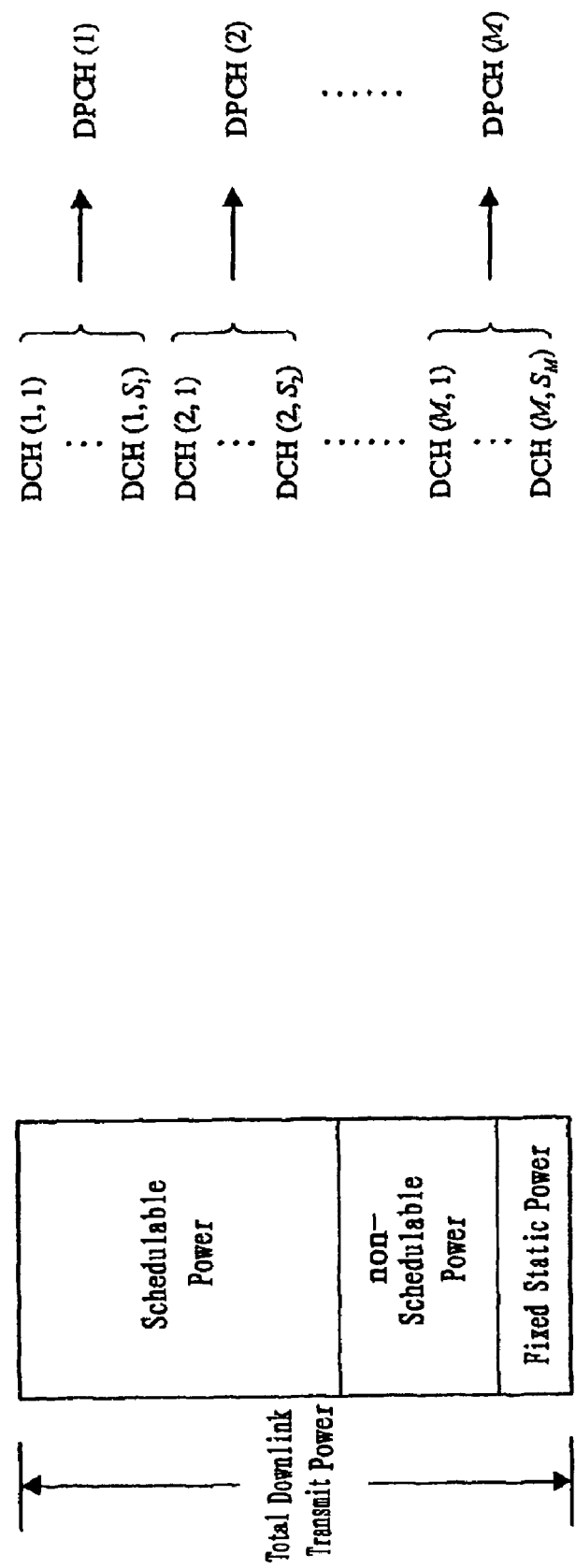
Figure 6:
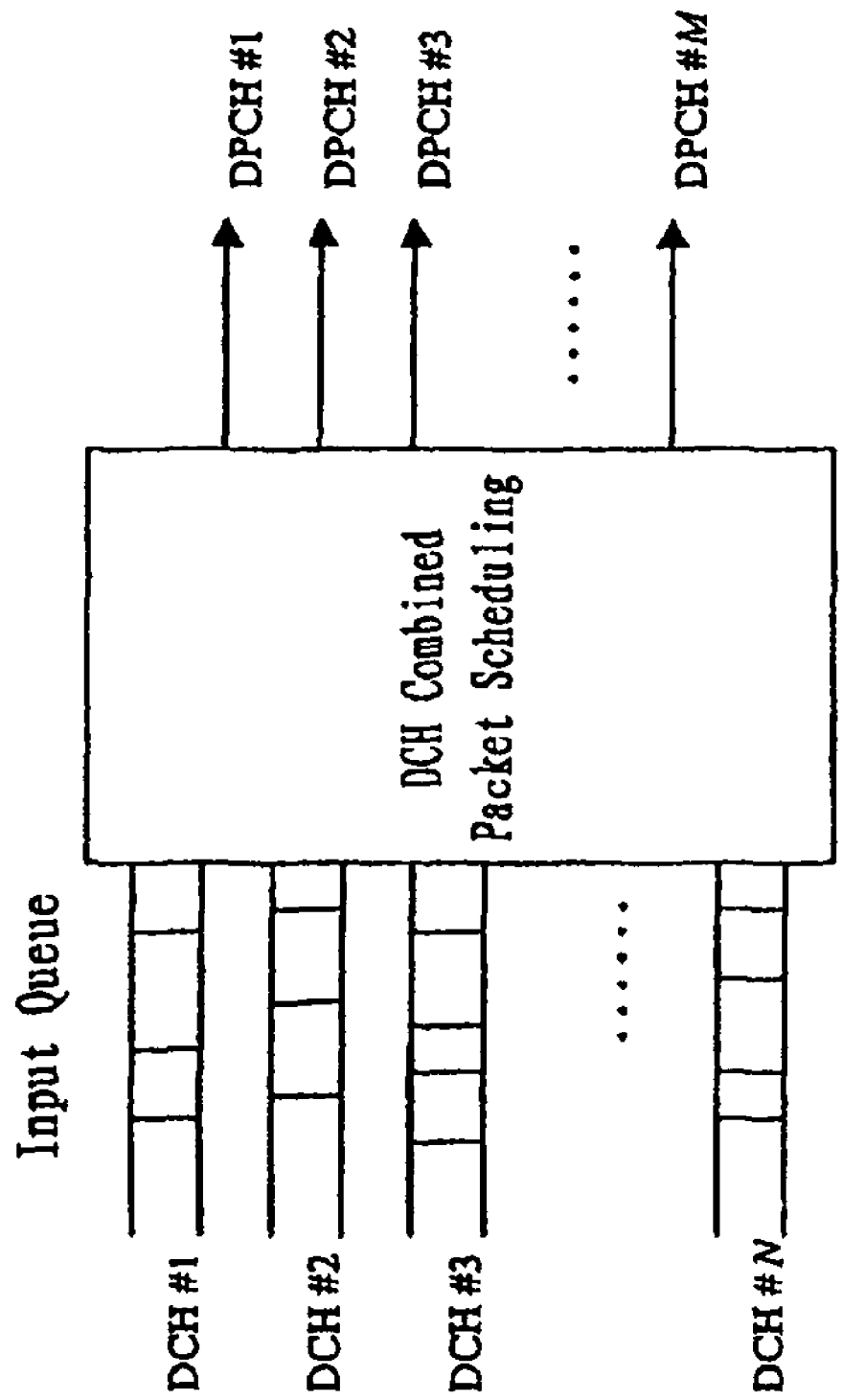
Figure 8:
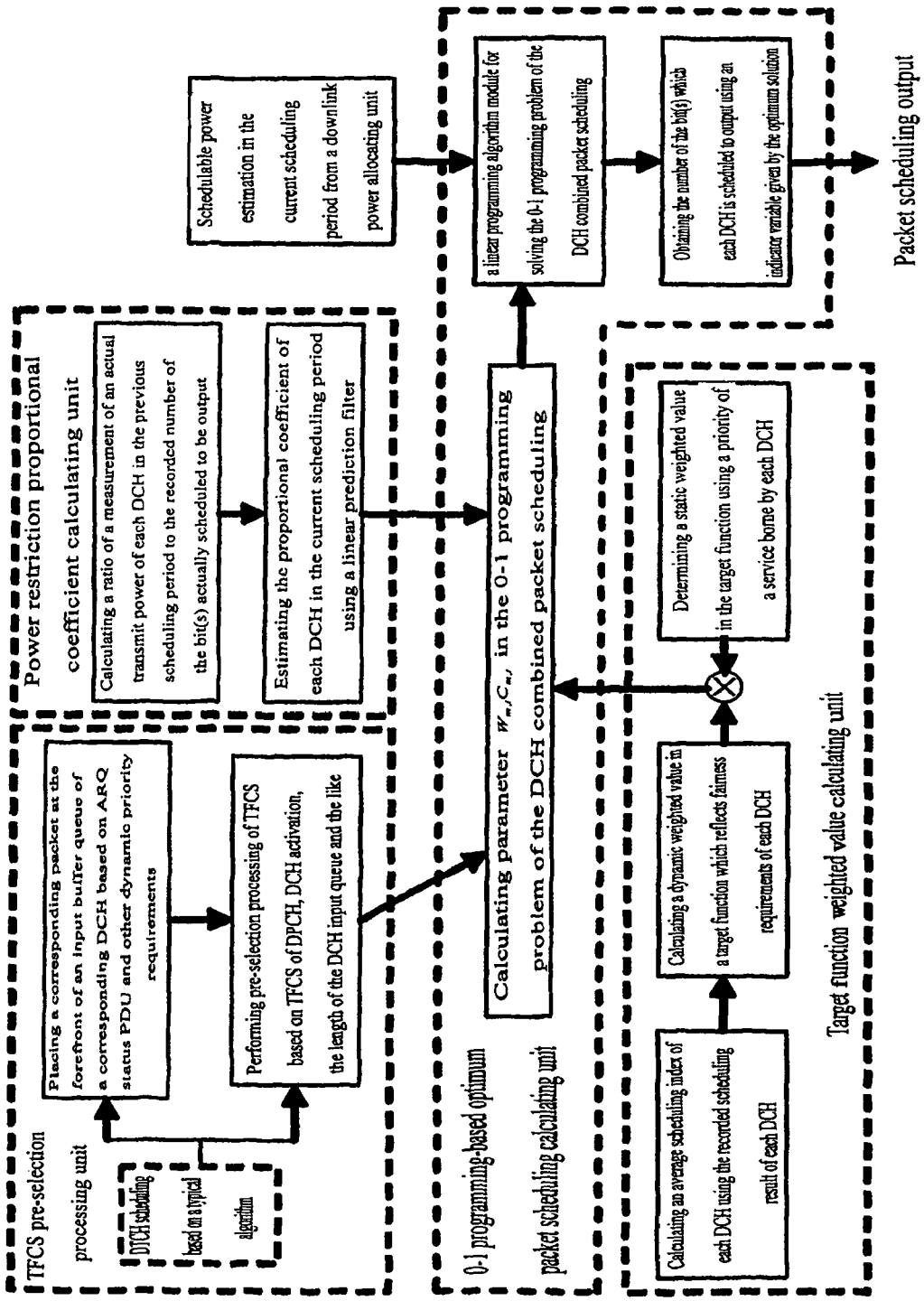

FIG. 5 schematically shows the composition of a downlink transmit power in the UTRAN;

FIG. 6 schematically shows a packet scheduling model from downlink DCHs to DPCHs in the UTRAN;

FIG. 7 schematically shows the corresponding relations between the downlink DCHs and the DPCHs in the UTRAN; and FIG. 8 is a schematic view showing the apparatus for packet combined scheduling of downlink DCHs according to the present invention.

BEST MODE FOR CARRYING OUT THE INVENTION

The best modes for carrying out the present invention are described below with reference to the accompanying drawings. Those skilled in the art can better understand the technical solutions of the present invention based on the more detailed description of the technical solutions of the present invention with reference to the accompanying drawings.

Referring to FIG. 6, it shows the packet scheduling model from downlink DCHs to DPCHs in the UTRAN. In the model shown in FIG. 6, N DCHs (marked as DCH#1, DCH#2, DCH#3, . . . DCH#N, respectively), in their respective input queues, queue up for being output to the corresponding M DPCHs (marked as DPCH#1 DPCH#2 DPCH#3, . . . DPCH#M), the maximum allowable rate of each DPCH being determined by its spreading factor, and one or more DCHs can be multiplexed on one DPCH, so M≦N. In the UMTS, the frame length of the physical channels is 10 ms, while the TTI length may be 10 ms, 20 ms, 40 ms, and 80 ms. DCHs of different UEs have different TTIs, so one scheduling is performed every 10 ms in the combined packet scheduling of downlink DCHs, and the scheduled transport blocks of each DCH are transmitted to the physical layer. The starting point of the present invention for solving the combined packet scheduling problem of downlink DCHs is to convert the problem into an optimization problem with restrictions.

First of all, the combined packet scheduling of downlink DCHs has three main goals: (a) maximizing the overall flow of data output in each scheduling; (b) guaranteeing the fairness of the respective DCH transportation; and (c) reflecting and guaranteeing the priority requirements of the DCHs. Among these, (a) is the basic requirement of packet scheduling, thereby effectively exploiting radio resources to the fullest extent and supplying users with the maximum data transport rate under the conditions of limited radio resources on the other hand. (b) is another requirement of packet scheduling, because the overall flow of data, instead of, the data flow of each DCH is maximized in the first goal; in order to obtain the maximum data transport rate from the angle of each user, the fairness must be sufficiently ensured. Meanwhile, different DCHs may have different priorities which are mainly determined by the priorities and other factors of DCH-borne services. For example, according to the 3GPP specification TS23.107, the QoS of the UMTS interactive-type service has a "Traffic Handling Priority". The packet scheduling mainly affects time delay, data rate and other QoS performances of packet data services, so the combined packet scheduling of downlink DCHs should reflect and guarantee the QoS priority requirements of the DCHs. The priority resulting from the different QoS requirement of a service is actually a static priority. In addition, in each scheduling period, other factors may also produce a dynamic priority, and a typical example is a status PDU (Protocol Data Unit) packet in a RLC of an AM (Acknowledged Mode). The RLC of the AM adopts the ARQ (Automatic Repeat Request) technique and provides a low error-rate radio bearer capability at the sacrifice of time delay. Since the NRT packet service is error-sensitive rather than delay-sensitive, so the RLC of the AM is usually employed. The status PDU is used to transmit ARQ information from a receiving terminal of the RLC entity of the AM to a transmitting terminal. Thus, in order to reduce delay, a higher priority is needed for transmission.

On the other hand, the combined packet scheduling of downlink DCHs should further satisfy the following restriction conditions: (a) in each scheduling period (10 ms here), the total downlink transmit power of all the DCHs for NRT packet services should not exceed a schedulable power value within the estimation of the total downlink power in this period; (b) in each scheduling period, the size and number of the transport blocks which each DCH is scheduled to output should meet the limit of a TFCS (Transport Format Combination Set) which the DCH corresponds to; (c) a different DCH has a different TTI, but the scheduling takes a radio frame as a period. Thus, in one scheduling period, when a certain DCH has been activated, namely, if the DCH is scheduled to have output a certain amount of transport blocks in the previous scheduling period, the DCH cannot be re-scheduled to output new transport blocks in the current scheduling period but should conduct a new scheduling until the next TTI of the DCH arrives; (d) in each scheduling period, the number of transport blocks which a DCH is scheduled to output not only depends on a scheduling system but also depends on the amount of data waiting to be transported in an input queue. In order to avoid generating unnecessary padding bits in a RLC layer which causes waste of radio transport bandwidth, the transport capacity which a transport format of the DCH corresponds to and which is selected by the scheduling should be made less than the amount of data to be transported in the input queue of the DCH in the current scheduling period.

1. Target Function in DCH Combined Packet Scheduling

According to the foregoing goals of DCH combined packet scheduling, the present invention adopts the following linear target function to solve the optimal packet scheduling output:

$$J_k = \sum_{n=1}^{N} w_{k,n} R_{k,n} \quad (1)$$

where $J_k$ represents a target function of the k-th scheduling period, $w_{k,n}$ represents a weighted value which the n-th DCH corresponds to in the k-th scheduling period, and $R_{k,n}$ is the to-be-solved number of bit(s) which the n-th DCH is scheduled to output in the k-th scheduling period, whose value domain, as described below, is a discrete limited area. As mentioned above, the priorities resulting from different QoS requirements of a service are a static priority, so the present invention defines the priorities as a static weighted value portion of the above target function. At the same time, in order to reflect the fairness requirements of DCH transportation in the goals of the combined packet scheduling, the present invention proposes to characterize the fairness as a dynamic weighted value portion of the above target function, that is, $$w_{k,n} = w_n^{QoS} \cdot w_{k,n}^{Fair} \quad (2)$$

where $w_n^{QoS}$ represents a static weighted value which determined by the priority of a service borne by the n-th DCH and which the n-th DCH corresponds to, $w_{k,n}^{Fair}$ represents a dynamic weighted value which the n-th DCH corresponds to and which reflects the fairness requirements of the DCH in the k-th scheduling period.

Need to particularly explain that the fairness has nothing to do with the DCH rate, because the transport rate of a DCH is determined by a bandwidth or spreading factor of a DPCH which the DCH corresponds to, and both a DCH at a high rate and a DCH at a low rate should acquire the same fair chance for a scheduled output. Therefore, the present invention proposes, in order to reflect the fairness requirements of each DCH transportation, to use the historical (i.e. in the past period of time) scheduling frequency of the DCH and a relative amount of each scheduling, i.e., "scheduling index", to determine the above dynamic weighted value $w_{k,n}^{Fair}$ reflecting the DCH fairness requirements. According to the present invention, the "scheduling index" of the n-th DCH in the $(k-1)^{th}$ scheduling period is defined as $$\eta_{k-1,n} = \begin{cases} \dfrac{R_{k-1,n}}{\max\{R_{k-1,n}\}} & \max\{R_{k-1,n}\} \neq 0 \\ 1 & \max\{R_{k-1,n}\} = 0. \end{cases} \quad (3)$$

In Formula (3), $R_{k-1,n}$ represents the number of the bit(s) which the n-th DCH is scheduled to output in the (k-1)-th scheduling period, and $\max\{R_{k-1,n}\}$ represents the maximum of the schedulable bit which the n-th DCH corresponds to in a discrete limited area in the (k-1)-th scheduling period. Obviously, the value of $\eta_{k-1,n}$ is between 0 and 1, and since the value domain of $R_{k-1,n}$ itself is a discrete limited area, $\eta_{k-1,n}$ is also a discrete limited area. According to the definition of the above "scheduling index", this parameter is irrelevant with the rate of $DCH_n$ and it reflects the scheduled degree of the $DCH_n$ in the (k-1)-th scheduling period.

By filtering the scheduling index of the n-th DCH during the past period of time, we can obtain a historical average scheduling index $\bar{\eta}_{k,n}$ of the n-th DCH. According to the present invention, one of the following three smoothing filtering ways can be preferable employed:

$$\begin{cases} \bar{\eta}_{k,n} = \frac{1}{L}\sum_{l=1}^{L}\eta_{k-l,n} & (4a) \\ \bar{\eta}_{k,n} = \frac{1}{L}\sum_{l=1}^{L}\lambda^{l-1}\eta_{k-l,n} & (4b) \\ \bar{\eta}_{k,n} = (1-\beta)\cdot\bar{\eta}_{k-1,n} + \beta\cdot\eta_{k-1,n} & (4c) \end{cases}$$

In the above formula, L represents the number of the past scheduling periods participating in the smoothing filtering, forgetting factor being $\lambda\in(0, 1]$, and the function of the factor lies in adjusting the significance of the past scheduling index in the filtering. The closer to 0 the forgetting factor is, the smaller function the past scheduling index performs, and when l=1, Formula (4b) will be the average in the L-th period as represented in Formula (4a). Formula (4c) actually indicates that a first-order IIR (Infinite Impulse Response) is employed to conduct the smoothing filtering, wherein the filter coefficient is $\beta\in[0, 1]$.

After solving the smoothing-filtered historical scheduling index $\bar{\eta}_{k,n}$ of $DCH_n$ using Formula (4), a dynamic weighted value $w_{k,n}^{Fair}$ which reflects the fairness requirements of $DCH_n$ in the current scheduling period can be expressed, according to the present invention, by a monofonic decent function of $\bar{\eta}_{k,n}$. Preferably, one of the following two computing methods can be used to determine the dynamic weighted value:

$$\begin{cases} w_{k,n}^{Fair} = 1 - \bar{\eta}_{k,n} & (5a) \\ w_{k,n}^{Fair} = \frac{1}{\bar{\eta}_{k,n}} & (5b) \end{cases}$$

In Formula (5b), in order to prevent $\bar{\eta}_{k,n}$ from being excessively small, which may result in value instability, a threshold value can be further used to limit the maximum weighted value.

Finally, as for the dynamic priority resulting from ARQ and other factors, the invention does not take it as a weighted value of the target function, but adopts the following queue management technique to reflect the dynamic priority: taking the status PDU scheduling in a RLC of the AM as an example, once an input buffer queue of any DCH receives packets containing the status PDU, it immediately puts the packets at the forefront of the input buffer queue of the DCH so as to enable the status PDU to get the preferential transmission chance.

2. Restriction conditions of DCH Combined Packet Scheduling

Based on the foregoing restriction conditions of the DCH combined packet scheduling, the total downlink transmit power of all the DCHs for NRT packet services in each scheduling period should be not more than the schedulable power value in the estimated total downlink power in the same period. These restriction conditions can be expressed as:

$$\sum_{n=1}^{N} P_{k,n} \leq P_k^{Scheduled} \quad (6)$$

In the above formula, $P_{k,n}$ represents the average transmit power required by the n-th DCH in the k-th scheduling period, and $P_k^{Scheduled}$ represents the maximum allowable power allocated to DCHs bearing NRT packet services from the estimated downlink power in the k-th scheduling period.

With the influences of rate matching being ignored, an average transmit power in the downlink direction of a DCH within a radio frame can be approximately expressed as a product of the bit rate of the DCH and a proportional coefficient, wherein the bit rate of the DCH corresponds to the number of the bit(s) the DCH within the radio frame which is scheduled to be output in a scheduling period. However due to propagation loss, multi-path fading and other factors of a wireless channel, the proportional coefficient thereof dynamically changes in each radio frame. Thus, the present invention proposes to estimate the proportional coefficient of the current scheduling period by using a linear prediction filter. For instance, a first-order α tracker/predictor can be more simply utilized:

$$\hat{c}_{k,n} = (1-\alpha)\cdot\hat{c}_{k-1,n} + \alpha\cdot c_{k-1,n} \quad (7)$$

In Formula (7), the filter coefficient is a $\alpha\in[0, 1]$; $\hat{c}_{k,n}$ represents a predicted/estimated value of the proportional coefficient of the average transmit power of the n-th DCH and the number of the bit(s) the n-th DCH scheduled to be output in the k-th scheduling period, and $c_{k-1,n}$ is a ratio of a measurement of an actual transmit power of the n-th DCH and the number of the bit(s) actually scheduled to be output in the (k-1)th scheduling period. Thus, the power restriction conditions of DCH combined packet scheduling in Formula (6) can be further expressed as:

$$\sum_{n=1}^{N} \hat{c}_{k,n} R_{k,n} \leq P_k^{Scheduled} \quad (8)$$

To satisfy other above-analyzed restriction conditions for DCH combined packet scheduling, the present invention sets forth, prior to each scheduling period, conducting a pre-selection process of TFCS of each DPCH using these restriction conditions, the discrete limited area of each DCH being determined by the pre-selected usable TFCS of the corresponding DPCH.

(1) Restriction condition (b) (namely, in each scheduling period, the size and number of TBs which each DCH is scheduled to output should meet the limits of its corresponding TFCS) has actually presented the TFCS of each DPCH, so this step is not necessary to be executed in each scheduling period. Unless RRC is altered or reallocated, TFCS of each DPCH will stay all the same in every scheduling period. The usable TFCS of each DPCH obtained by Step (1) is marked as $TFCS_m^{(0)} = \{(TF_1, TF_2, \ldots, TF_{S_m})\}_m^{(0)}$, where m=1, 2, ... M, $S_m$ is the TFC's dimention of the m-th DPCH, that is, S (m) DCHs are multiplexed on the m-th DPCH;

(2) On the basis of restriction condition (c) (namely, in each scheduling period, when a certain DCH has been activated, if this DCH was scheduled to have output an amount of TBs in the previous scheduling period, then the DCH, in the current scheduling period, cannot be re-scheduled to output TBs but to conduct a new scheduling until the next TTI thereof arrives), it is determined whether or not each DCH in each DPCH has been activated in the current scheduling period; if a certain DCH has been activated, then the combination of all the transport formats excluding the transport format being used by the DCH should be removed from the usable TFCS obtained by Step (1) of the DCPCH which the DCH corresponds to. The usable TFCS of each DPCH obtained by Step 2 is marked as $TFCS_m^{(1)} = \{(TF_1, TF_2, \ldots, TF_{S_m})\}_m^{(1)}$, where m=1, 2, ... M;

(3) On the basis of restriction condition (d) (namely, a transport capacity which the transport format of the DCH selected by the scheduling corresponds to should be not more than the amount of all the data required to be transported in an input queue of the DCH during the current scheduling period), from the usable TFCS of each DPCH obtained by Step (2), all the TFCS which satisfy the following conditions are further removed: the TFC should contain at least one transport format indicating that the number of the bit(s) transportable on the corresponding DCH within the scheduling period is greater than the length of the current input buffer queue of the corresponding DCH. The usable TFCS of each DPCH obtained by Step (3) is marked as $TFCS_m^{(2)} = \{(TF_1, TF_2, \ldots, TF_{S_m})\}_m^{(2)}$, where m=1, 2, ... M;

Thus, by utilizing the usable TFC set $TFCS_m^{(2)}$ of each DPCH obtained from the above TFCS pre-selection process, the discrete limited area of each DCH will be determined. However, need to note that when a plurality of DCHs are multiplexed on one DPCH, the range spaces of all the DCHs of the DPCH obtained thereby are coupled and they are limited by the limited combinations given by $TFCS_m^{(2)}$.

3. Converting DCH Combined Packet Scheduling Problem into 0-1 Programming Problem Based on the foregoing analysis, in the k-th scheduling period (subscript k is hereinafter omitted for clarity), the DCH combined packet scheduling can be expressed as a mathematic programming problem which adopts linear restrictions and linear target functions in the discrete limited area.

$$J = \sum_{n=1}^{N} w_n R_n,$$

$$\sum_{n=1}^{N} \hat{c}_n R_n \leq P^{Scheduled},$$

Without limiting the value domain of the variables, the above problem would be a typical linear programming problem. A quite simple and effective computing method to solve the linear programming problem is the simplex method which is widely used in engineering. However, when the variables can only take their values from the discrete limited area, no systematic and effective computing method is available until now. The searching-type algorithm is a basic method for solving such problem, but when the number of the variables and the value domain thereof turn larger, the calculation amount will become too enormous to be practically used. Moreover, the coupling of the value domain space of DCHs multiplexed on the same DPCH causes the problem to be solved more complicatedly. Thus, the present invention utilizes the following variable conversion technique to convert the aforesaid problem into a special combination optimizing problem, i.e., the 0-1 programming problem which can be easily solved.

To describe easily, as shown in FIG. 7, DCHs multiplexed to the same DPCH are regarded as a groupe, so M DPCHs have M groups of DCHs, each group containing $S_m$ (m=1, 2, ... M) DCHs. The DCHs are numbered as $DCH_{m,1}$, $DCH_{m,2}, \ldots, DCH_{m,S_m}$ based on their turns in the TFC of the corresponding $DPCH_m$, and $R_n$, $w_n$, $\hat{c}_n$ in the aforesaid optimizing problem are also correspondingly marked as $R_{m,j}$, $w_{m,j}$, $\hat{c}_{m,j}$, where j=1, 2, ..., $S_m$. Thus, the following equation is obtained:

$$\sum_{m=1}^{M} S_m = N \tag{9}$$

Suppose the number of elements in the usable TFC set ($TFCS_m^{(2)}$) of $DPCH_m$ is $D_m$. Introduce $D_m$ new 0-1 indicator variables $q_{m,i} \in \{0,1\}$, i=1, 2, ..., $D_m$ to correspond to each element in the set, thereby obtaining:

$$R_{m,j} = \sum_{i=1}^{D_m} [q_{m,i} \cdot r_{m,j}(i)],$$

and the following indication restriction being satisfied:

$$\sum_{i=1}^{D_m} q_{m,i} = 1. \tag{10}$$

In Formula (10), $r_{m,j}(i)$ is the number of transmissible bit(s) in the current scheduling period indicated by the transport format of the j-th DCH contained in the i-th TFC of the $TFCS_m^{(2)}$. Thus, by utilizing the newly introduced 0-1 indicator variables, we can not only remove the coupling of the value domain space of DCHs multiplexed to the same DPCH, but also convert the above optimizing problem into the following equivalent 0-1 programming problem:

$$\begin{cases} S + \sum_{m=1}^{M} \sum_{i=1}^{D_m} (C_{m,i} \cdot q_{m,i}) = P^{Scheduled}, S \geq 0 \\ \sum_{i=1}^{D_m} q_{m,i} = 1, q_{m,i} \in \{0, 1\}, m = 1, 2, \ldots M \end{cases}$$

$$J = \sum_{m=1}^{M} \sum_{i=1}^{D_m} (W_{m,i} \cdot q_{m,i})$$

The parameters $W_{m,i}$ and $C_{m,i}$ in the above formula can be obtained by the following equations:

$$\begin{cases} W_{m,i} = -\sum_{j=1}^{S_m} [W_{m,j} \cdot r_{m,j}(i)] & \text{(11a)} \\ C_{m,i} = \sum_{j=1}^{S_m} [\hat{c}_{m,j} \cdot r_{m,j}(i)] & \text{(11b)} \end{cases}$$

Please note that in order to express the 0-1 programming problem in a standard form, a slack variable S is introduced, and the target function maximization is converted into the target function minimization. Once the optimum solution of the aforesaid 0-1 programming problem is solved, the number of the bit(s) output in the optimum scheduling of each DCH in the current scheduling period can be solved from Formula (10).

4. Converting 0-1 Programming Problem into Linear Programming Problem

There is no universal solving method for the 0-1 programming problem at present, and most algorithms are proposed to solve some particular types of problems. Note that the literature "A. K. Khandani, Linear (Zero-one) programming approach to fixed-rate entropy-coded vector quantisation, IEE Proceedings of Communication, Vol. 146, No. 5, Oct. 1999, pp 275-282" presents a solving method for some type of 0-1 programming problem. The 0-1 programming problem aims at the application of optimum bit allocation in the fixed-rate entropy-coded vector quantization in the above literature, but the mathematical model established based on the 0-1 programming problem in this literature is identical with the 0-1 programming of the DCH combined packet scheduling as presented in the present invention. Therefore, the conclusions and calculating methods for the 0-1 programming problem in this literature can be directly applied to the present invention. The whole text of this literature is cited here for reference.

According to the conclusion in Section 2.1 of the aforementioned literature, the 0-1 restrictions over the indicator variables in the 0-1 programming problem can be directly loosed, and the 0-1 programming problem is solved as a typical linear programming problem. The optimum solution always guarantees that only at most two indicator variables lie between 0 and 1, while other indicator variables will be flat 0 or 1. As for the two variables between and 1, we can directly quantize them as 0 or 1 by the approximating method, which exerts little and even negligible influence on the optimum solution. In this way, based on relevant theories of the linear programming and by adopting the effective simplex method, the 0-1 programming problem will be solved through about (M+1)~2(M+1) times of iterations.

In addition to the universal linear programming calculation methods, the aforementioned literature also presents a quick solution with decreased calculation amount to solve the corresponding linear programming problem, in light of the particularity of the 0-1 programming problem. Please refer to Section 2.2 of the literature for detailed algorithms.

5. Conclusions of DCH Combined Packet Scheduling Method

In the above description of downlink DCH combined packet scheduling method of the present invention, the following two possible practical cases have not been discussed: one is that different DTCHs may be multiplexed to one DCH in the MAC layer; the other is that DCHs for transporting NRT packet services and DCHs for transporting RT services, such as the AMR (Adaptive Multi-Rate) voice service may be multiplexed to one DPCH.

In the first case, the respective DTCHs multiplexed to one DCH have the same QoS requirements and share the same transport bandwidth of the DCH in a TDM (Time Division Multiplexing) way. As for this case, the present invention sets forth to first adopt typical scheduling algorithms, such as Round-Robin, WFQ or WF²Q, to conduct DTCH scheduled allocation for the corresponding DCH, and then to apply the method of the present invention to perform the downlink DCH combined packet scheduling.

As for the second case, the present invention sets forth to separately process the DCHs for transporting NRT packet services and the DCHs for transporting RT services, namely, only considering the influence of DCHs for transporting NRT packet services in the power restrictions, and when determining the usable TFC set, only adopting the descending dimensional TFC formed by the transport formats of the DCHs for transporting NRT packet services, so that the DCH combined packet scheduling method presented in the present invention is still usable.

In summary, an apparatus for downlink DCH combined packet scheduling presented according to the present invention is shown in FIG. 8. The apparatus is made up of 4 functional units: TFCS pre-selection processing Unit, power restriction proportional coefficient calculating unit, target function weighted value calculating unit, and 0-1 programming-based optimum packet scheduling calculating unit. The apparatus operates once in each scheduling period to obtain the scheduling output result of each DCH in each scheduling period.

As shown in FIG. 8, during each scheduling period, in the TFCS pre-selection processing unit, as for the DCH to which different DTCHs are multiplexed, first execute a DTCH scheduled allocation for the corresponding DCH by adopting typical scheduling algorithms such as Round-Robin, WFQ or WF²Q; then, as for an input buffer queue of each DCH, based on the dynamic priority requirements such as status PDU in a RLC of the AM, put the high-priority packet at the forefront of the input buffer queue of the corresponding DCH; afterwards, conduct pre-selection in light of restriction conditions such as TFCS of the corresponding DPCH, whether the DCH is activated, and the length of the input buffer queue of the DCH, and obtain the usable TFC set of each DPCH in the current scheduling period; refer to the above for the specific processing steps. Correspondingly, the TFCS pre-selection processing unit can comprise one or more modules to perform the processes independently or jointly, for example, comprising: a DTCH scheduling module which executes a DTCH scheduled allocation of the DCH based on Round-Robin, WFQ or WF²Q scheduling algorithm; a priority queuing module which puts the high-priority packet, such as the status PDU in the RLC of the AM, at the front of the input buffer queue of the corresponding DCH; a TFCS pre-selection processing Module which conducts the pre-selection processing based on a TFCS of the DPCH, the activated DCH, and the length of the input queue of the DCH, thereby to obtain the usable $TFCS_m^{(2)}$ of each DPCH in the current scheduling period.

During each scheduling period, in the power restriction proportional coefficient calculating unit, first calculate the ratio of a measurement of each DCH's actual transmit power to the recorded actual number of the bit(s) scheduled to be output in a scheduling period prior to the current scheduling period; then utilize a linear prediction filter to estimate/predict a proportional coefficient of each DCH in the current scheduling period, wherein the linear prediction filter can typically utilize the first-order α tracer/predictor shown in Formula (7).

During each scheduling period, in the target function weighted value calculating unit, first calculate average scheduling indexes based on Formula (3) and Formula (4) by using the recorded historical scheduled output of each DCH; then based on Formula (5), calculate a dynamic weighted value in the target function which reflects fairness requirement of each DCH; on the other hand, determine the static weighted value in the target function which reflects the QoS priority of each DCH on the basis of priority information of services borne by each DCH; finally multiply the static weighted value and the dynamic weighted value, thereby obtaining a weighted value of the original target function. The target function weighted value calculating unit can also comprise one or more modules to perform the processes independently or jointly, for example including: a dynamic weighted value calculating module which calculates the dynamic weighted value in the target function according to the recorded scheduling result of each DCH based on the fairness requirement of each DCH; a static weighted value calculating module which determines the static weighted value based on the priorities of services borne by each DCH; and a multiplier which multiplies the dynamic weighted value and the static weighted value thereby to obtain the weighted value of the target function.

During each scheduling period, after obtaining the output results of the TFCS pre-selection processing unit, power restriction proportional coefficient calculating unit and the target function weighed value calculating unit, the 0-1 programming-based optimum packet scheduling calculating unit calculates the maximum number of the bit(s) of each DCH. As scheduled to be output. According to an embodiment of the present invention, the 0-1 programming-based optimum packet scheduling calculating unit can also comprise one or more modules to perform the processes independently or jointly, for example including: a 0-1 programming parameter calculating module which calculates, based on Formula (II), parameters $W_{m,i}$ and $C_{m,i}$ in the 0-1 programming problem of downlink DCH combined packet scheduling; a linear programming calculating module which calculates the optimum solution vector of indicator variables in the 0-1 programming problem of downlink DCH combined packet scheduling by utilizing parameters $W_{m,i}$, $C_{m,i}$ and the schedulable power estimation in the current scheduling period, wherein the schedulable power estimation in the current scheduling period is provided by the downlink power allocating unit of a cell radio resource management module; and a DCH scheduled output bit calculating module which calculates the number of the bit(s) each DCH scheduled to be output in the current scheduling period based on Formula (10) by using the optimum solution vector of the indicator variables output by the linear programming calculating module.

The downlink DCH combined packet scheduling apparatus according to the present invention as shown in FIG. 8, the TFCS pre-selection processing unit, the power restriction proportional coefficient calculating unit, and the target function weighted value calculating unit can be realized by different hardware or software in parallel, or realized by identical hardware or software sequentially, wherein the paralleling method can better meet the real-time requirements of the packet scheduling. In addition, the linear programming calculating unit of the 0-1 programming problem is a primary unit performing intensive calculation amount in the present invention, and it can realize high-speed computation by using special hardware or software units so as to meet the real-time requirements of the downlink DCH combined packet scheduling.

The method and apparatus for downlink DCH packet combined scheduling in UMTS of the present invention are illustrated above with reference to the accompanying drawings. The present invention is not limited for the use in UMTS. As for other channels having the similar channel structure, the principles of the present invention are applicable as well. As known by those skilled in the art, variable modifications and improvements can be made to the present invention according to the principles thereof, without departing from the scope of the claims annexed to the description.

What is claimed is:

1. A method for performing packet combined scheduling of dedicated transport channels for packet services in UMTS downlinks, wherein dedicated traffic channels (DTCHs) in logical channels are mapped as dedicated channels (DCHs) in transport channels, and N DCHs, in their respective input queues, queue up for being transported to the corresponding M DPCHs, where M≦N, the method being characterized in that the method for performing packet combined scheduling of the DCHs comprises the following steps:

a) prior to each DCH scheduling period, performing pre-selection processing of a transport format combination of each DPCH according to the predetermined restriction conditions for the DCH combined packet scheduling, so as to determine a usable transport format combination set $TFCS_m^{(2)}$ for each DPCH;

b) restricting a total downlink transmit power $$\sum_{n=1}^{N} P_{k,n}$$

of DCHs for NRT packet services to a schedulable power not exceeding a schedulable power in the estimation of a total downlink power during said scheduling period, i.e., the maximum allowable power value $P_k^{Schedulaed}$, where $P_{k,n}$ denotes an average transmit power required by the N-th DCH in the k-th scheduling period, and $P_k^{Scheduled}$ denotes the maximum allowable power allocated to the DCHs which bear NRT packet services in the estimation of downlink power in the k-th scheduling period, and calculating a predicted/estimated value $\hat{c}_{k,n}$ of a proportional coefficient of an average transmit power $P_{k,n}$ of the n-th DCH and the number of the bit(s) $R_{k,n}$ of the n-th DCH scheduled to be output in the k-th scheduling period;

c) based on fairness of DCH transportation and QoS requirements of the DCH-borne services, determining weighted values which the respective DCHs correspond to in the optimization of the DCH combined packet scheduling; and d) based on the results of steps a), b), and c), calculating the maximum number of bit(s) which each DCH is schedulable to output, using a 0-1 programming algorithm.

2. The method as defined in claim 1, wherein said determining the usable transport format combination set $TFCS_m^{(2)}$ for each DPCH according to the predetermined restriction conditions for the DCH combined packet scheduling in step a) further comprises:

placing a high-priority packet at the front of an input buffer queue of a corresponding DCH; and performing the pre-selection processing on TFCS based on the TFCS of the DPCH, the activated DCH, and the length of the input queue of the DCH, thereby obtaining the usable $TFCS_m^{(2)}$ of each DPCH in the current scheduling period.

3. The method as defined in claim 2, wherein the pre-selection processing further comprises the steps of:

i) selecting a TFC set $\text{TFCS}_m^{(0)}=\{(TF_1, TF_2, \ldots, TF_{S_m})\}_m^{(0)}$ in which the size and number of transport blocks which each DCH is scheduled to output meet the limit of the TFCS which the DCH corresponds to, where m=1, 2, ... M, $S_m$ representing the dimension of the TFC of the m-th DPCH, that is, S (m) DCHs are multiplexed on the m-th DPCH;

ii) determining whether each DCH in each DPCH has been activated in the current scheduling period; if a certain DCH has been activated, then removing all the transport formats combinations excluding the transport format being currently used by the DCH from the usable TFC set obtained by step (i) of the DPCH which the DCH corresponds to, the usable TFC set of each DPCH obtained by step ii) being marked as $\text{TFCS}_m^{(1)}=\{(TF_1, TF_2, \ldots, TF_{S_m})\}_m^{(1)}$, where m=1, 2, ... M; and iii) removing all transport formats combinations which satisfy the following conditions from the usable TFC set of each DPCH obtained by step (ii): the TFC contains at least one transport format indicating that the number of the bit(s) transportable on the corresponding DCH within the current scheduling period is greater than the length of the current input buffer queue of the corresponding DCH, the usable TFC set of each DPCH obtained by step (iii) being marked as $\text{TFCS}_m^{(2)}=\{(TF_1, TF_2, \ldots, TF_{S_m})\}_m^{(2)}$, where m=1, 2, ... M.

4. The method as defined in claim 2, wherein the high-priority packet is a status Protocol Data Unit packet of a Radio Link Control layer of an Acknowledged Mode.

5. The method as defined in claim 1 wherein said method further comprises, prior to the pre-selection processing in step a), a step of performing DTCH scheduling allocation for the DCH by using the Round-Robin, WFQ or WF$^2$Q scheduling algorithm.

6. The method as defined in claim 1, wherein the proportional coefficient $\hat{c}_{k,n}$ in the current scheduling period is predicted/estimated by using a linear prediction filter based on the following equation:

$$\hat{c}_{k,n}=(1-\alpha)\cdot\hat{c}_{k-1,n}+\alpha\cdot c_{k-1,n},$$

where $\alpha$ is a filter coefficient and $\alpha\in[0, 1]$; $c_{k-1,n}$ is a ratio of a measurement value of an actual transmit power of the n-th DCH and the number of the bit(s) actually scheduled to be output in the (k-l)-th scheduling period.

7. The method as defined in claim 1, wherein step c) further comprises a step of determining the corresponding weighted values of respective DCHs in the DCH combined packet scheduling optimization based on a product of a dynamic weighted value $w_{k,n}^{Fair}$ and a static weighted value $w_n^{QoS}$, wherein
the static weighted value $w_n^{QoS}$ is determined based on the priorities of services borne by the n-th DCH;
an average scheduling index $\overline{\eta}_{k,n}$ of the n-th DCH in the k-th scheduling period is calculated based on the recorded scheduling result of each DCH, and the dynamic weight value $w_{k,n}^{Fair}$ is determined based on the following formula:

$$w_{k,n}^{Fair} = 1 - \overline{\eta}_{k,n}; \text{ or } w_{k,n}^{Fair} = \frac{1}{\overline{\eta}_{k,n}}.$$

8. The method as defined in claim 7, wherein the average scheduling index $\overline{\eta}_{k,n}$ is determined by one of the following methods:

i) smoothing filtering the scheduling index of the n-th DCH in the past (k-l)-th scheduling period:

$$\overline{\eta}_{k,n} = \frac{1}{L}\sum_{l=1}^{L} \eta_{k-l,n},$$

wherein L represents the number of the past scheduling periods participating in the smoothing filtering;

ii) adjusting the formula in method i):

$$\overline{\eta}_{k,n} = \frac{1}{L}\sum_{l=1}^{L} \lambda^{l-1} \eta_{k-l,n},$$

where factor $\lambda$ is $\lambda\in(0, 1]$; or iii) performing the smoothing filtering by using a first-order Infinite Impulse Response filter: $\overline{\eta}_{k,n}=(1-\beta)\cdot\overline{\eta}_{k-1,n}+\beta\cdot\eta_{k-1,n}$, where filter coefficient $\beta$ is $\beta\in[0, 1]$.

9. The method as defined in claim 8, wherein the "scheduling index" of the n-th DCH in the (k-l)-th scheduling period is defined as:

$$\eta_{k-l,n} = \begin{cases} \dfrac{R_{k-l,n}}{\max\{R_{k-l,n}\}} & \max\{R_{k-l,n}\} \neq 0 \\ 1 & \max\{R_{k-l,n}\} = 0. \end{cases}$$

where, $R_{k-l,n}$ represents the number of the bit(s) which the n-th DCH is scheduled to output in the (k-l)-th scheduling period, and $\max\{R_{k-l,n}\}$ represents the maximum value in a discrete limited area of the schedulable bits which the n-th DCH corresponds to in the (k-l)-th scheduling period.

10. The method as defined in claim 1, wherein step d) further comprises:
converting the maximization of a target function in the DCH combined packet scheduling into 0-1 programming minimizing the target function by using the calculating results in steps a), b) and c), then further converting the 0-1 programming into a linear programming for processing, thereby calculating the number of the bit(s) which each DCH is scheduled to output, wherein
the target function in the DCH combined packet scheduling is defined as:

$$J = \sum_{n=1}^{N} w_n R_n,$$

where $R_n$ should satisfy the restriction condition:

$$\sum_{n=1}^{N} \hat{c}_n R_n \leq P^{Scheduled},$$

and $R_n \in \Psi_n$, wherein $\Psi_n$ is a discrete limited area;
the target function minimized by the 0-1 programming and converted from the target function in the DCH combined packet scheduling is defined as:

$$J = \sum_{m=1}^{M} \sum_{i=1}^{D_m} (W_{m,i} \cdot q_{m,i}),$$

the restriction condition being $$\begin{cases} S + \sum_{m=1}^{M} \sum_{i=1}^{D_m} (C_{m,i} \cdot q_{m,i}) = P^{Scheduled}, S \geq 0 \\ \sum_{i=1}^{D_m} q_{m,i} = 1, q_{m,i} \in \{0, 1\}, m = 1, 2, \ldots M \end{cases}$$

where, S is a slack variable, and parameters $W_{m,i}$ and $C_{m,i}$ in the above 0-1 programming are given in the following formulas:

$$W_{m,i} = -\sum_{j=1}^{S_m} [w_{m,j} \cdot r_{m,j}(i)]$$

$$C_{m,i} = \sum_{j=1}^{S_m} [\hat{c}_{m,j} \cdot r_{m,j}(i)],$$

and based on formula $$R_{m,j} = \sum_{i=1}^{D_m} [q_{m,i} \cdot r_{m,j}(i)],$$

calculating the number of the bit(s) $R_{j,i}$ which each DCH is optimally scheduled to output, wherein:
$q_{m,i}$ represents a 0-1 indicator variable and $q_{m,i} \in \{0, 1\}$, i=1, 2, ..., $D_m$; $D_m$ is the number of elements of the usable TFC set $TFCS_m^{(2)}$ of $DPCH_m$; $q_{m,i}$ corresponds to each element in said TFC set, respectively; DCHs multiplexed to the same DPCH are regarded as a group, so M DPCHs have M groups of DCHs, each group containing $S_m$(m=1, 2, ... M)DCHs, the DCHs being numbered as $DCH_{m,1}$, $DCH_{m,2}$, ..., $DCH_{m,S_m}$ based on their turns in the TFC of the corresponding $DPCH_m$, and $R_n$, $w_n$, $\hat{c}_n$ are also correspondingly marked as $R_{m,j}$, $w_{m,j}$, $\hat{c}_{m,j}$, where j=1, 2, ..., $S_m$, $r_{m,j}(i)$ being the number of transmissible bit(s) in the current scheduling period indicated by the transport format of the j-th DCH contained in the l-th TFC in the $TFCS_m^{(2)}$.

11. The method as defined in claim 1, wherein steps a), b) and c) are executed in a parallel way.

12. The method as defined in claim 1, wherein the scheduling period is the frame length of a physical channel.

13. An apparatus for performing packet combined scheduling of dedicated transport channels for packet services in UMTS downlinks, wherein dedicated traffic channels (DTCHs) in the logical channels are mapped as dedicated channels (DCHs) in the transport channels, and N DCHs, in their respective input queues, queue up for being transported to the corresponding M DPCHs, where M≦N; the apparatus being characterized in that the apparatus for performing the packet combined scheduling of the DCHs comprises:
a pre-selection processing unit for, prior to each DCH scheduling period, performing pre-selection processing of a transport format combination of each DPCH according to the predetermined restriction conditions for the DCH combined packet scheduling, so as to determine a usable transport format combination set $TFCS_m^{(2)}$ for each DPCH;
a power restriction proportional coefficient calculating unit for restricting a total downlink transmit power $$\sum_{n=1}^{N} P_{k,n}$$

of DCHs for NRT packet services to a schedulable power not exceeding a schedulable power in the estimation of a total downlink power during said scheduling period, i.e., the maximum allowable power value $P_k^{Scheduled}$, where $P_{k,n}$ denotes an average transmit power required by the N-th DCH In the k-th scheduling period, and $P_k^{Scheduled}$ denotes the maximum allowable power allocated to the DCHs which bear NRT packet services in the estimation of downlink power in the k-th scheduling period, and for calculating a predicted/estimated value $\hat{c}_{k,n}$ of a proportional coefficient of an average transmit power $P_{k,n}$ of the n-th DCH within the k-th scheduling period and the number of bit(s) $R_{k,n}$ which the n-th DCH is schedulable to output within the k-th scheduling period;
a target function weighted value calculating unit for, based on fairness of DCH transportation and QoS requirements of the DCH-borne services, calculating corresponding weighted values of respective DCHs in optimization of the DCH combined packet scheduling; and
a 0-1 programming-based optimum packet scheduling calculating unit for, based on output results of the pre-selection processing unit, the power calculating unit and the target function weighted value calculating unit, calculating the maximum number of the bit(s) which each corresponding DCH is schedulable to output, by using a 0-1 programming algorithm.

14. The apparatus as defined in claim 13, wherein the pre-selection processing unit further comprises:
a DTCH scheduling module for executing a DTCH scheduled allocation of the DCH by using Round-Robin, WFQ or WF²Q scheduling algorithm;
a priority queuing module for putting a high-priority packets, such as a status PDU of a RLC of the AM, at the front of the input buffer queue of the corresponding DCH;
a TFCS pre-selection processing module for conducting the pre-selection processing on TFCS based on the TFCS of the DPCH, the activated DCH, and the length of the input queue of the DCH, thereby to obtain the usable $TFCS_m^{(2)}$ of each DPCH in the current scheduling period.

15. The method as defined in claim 13, wherein said power calculating unit further comprises:
a linear prediction filter for estimating a power restriction proportional coefficient of each DCH in the current scheduling period based on a ratio of a measurement value of each DCH's actual transmit power to the recorded actual number of the bit(s) scheduled to be output in the previous scheduling period.

16. The apparatus as defined in claim 13, characterized in that said target function weighted value calculating unit further comprises:
a dynamic weighted value calculating module for calculating the dynamic weighted value in the target function according to the recorded scheduling result of each DCH based on the fairness requirement of each DCH;

a static weighted value calculating module for determining the static weighted value based on the priorities of services borne by each DCH; and a multiplier for multiplying the dynamic weighted value and the static weighted value of each DCH thereby to obtain the weighted value of the target function.

17. The apparatus as defined in claim 13, characterized in that said 0-1 programming-based optimum packet scheduling calculating unit further comprises:

a 0-1 programming parameter calculating module for converting, based on the output results of the pre-selection processing unit, the power restriction proportional coefficient calculating unit and the target function weighted value calculating unit, the maximization of a target function in the DCH combined packet scheduling into 0-1 programming minimizing the target function and calculating parameters $W_{m,i}$ and $C_{m,i}$ in the 0-1 programming problem;

a linear programming calculating module for calculating the optimum solution vector of indicator variables in the 0-1 programming problem of downlink DCH combined packet scheduling by utilizing the parameters $W_{m,i}$, $C_{m,i}$ and the schedulable power estimation in the current scheduling period, wherein the schedulable power estimation in the current scheduling period is provided by a downlink power allocating unit of a cell radio resource management module; and a DCH scheduled output bit calculating module for calculating the number of the bit(s) each DCH scheduled to be output in the current scheduling period based on the optimum solution vector of the indicator variables output by the linear programming calculating module.

18. The apparatus as defined in claim 13, wherein said pre-selection processing unit, said power calculating unit, and said target function weighted value calculating unit are operated in a parallel way.

19. The apparatus as defined in claim 13, wherein the scheduling period of the apparatus is the frame length of a physical channel.

* * * * *